US009892755B1

(12) United States Patent
Layman et al.

(10) Patent No.: US 9,892,755 B1
(45) Date of Patent: Feb. 13, 2018

(54) DIRECTING MEDIA CONTENT FOR PLAYBACK

(71) Applicant: Amazon Technologies, Inc., Seattle, WA (US)

(72) Inventors: Evan Walton Layman, Dallas, TX (US); Hagay Lupesko, Foster City, CA (US); Johnson Cheng, San Francisco, CA (US); Haydn Lee Gilbert, Emeryville, CA (US); Travis Ronald Langner, San Francisco, CA (US); Rickesh Pal, San Francisco, CA (US); Ivo Pletikosic, Livermore, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/671,962

(22) Filed: Mar. 27, 2015

(51) Int. Cl.
*G11B 20/10* (2006.01)
*G06F 3/16* (2006.01)

(52) U.S. Cl.
CPC ........ *G11B 20/10527* (2013.01); *G06F 3/165* (2013.01); *G11B 2020/10546* (2013.01)

(58) Field of Classification Search
CPC G06F 3/16; G06F 3/165; H04R 27/00; H04R 2227/005
USPC ......................................................... 700/94
See application file for complete search history.

(56) References Cited

U.S. PATENT DOCUMENTS

| 8,103,371 B2* | 1/2012 | Lapstun | B41J 3/445 |
| | | | 455/3.06 |
| 2006/0149850 A1* | 7/2006 | Bowman | G11B 27/10 |
| | | | 709/231 |
| 2009/0060219 A1* | 3/2009 | Inohara | H04S 3/002 |
| | | | 381/77 |
| 2013/0331970 A1* | 12/2013 | Beckhardt | G06F 3/165 |
| | | | 700/94 |
| 2015/0095459 A1* | 4/2015 | Schulert | H04N 21/41407 |
| | | | 709/219 |

* cited by examiner

*Primary Examiner* — Jesse A Elbin
(74) *Attorney, Agent, or Firm* — Thorpe North & Western, LLP.

(57) ABSTRACT

Technology is described for directing media content to a target device. A media content directing request may be received from a source device indicating that the source device intends to direct media content to the target device that is available for media content playback. A list of available target devices for media content playback may be provided to the source device. A playback message may be received from the source device that includes a selection of the target device from the list of available target devices. Communication of the playback message to the target device may be facilitated to initiate playback of media content from a media content playback server as directed by the source device.

20 Claims, 8 Drawing Sheets

DIRECTING MEDIA CONTENT FOR PLAYBACK

BACKGROUND

A user may consume and interact with numerous types of digital media content. For example, the user may listen to songs and audio books, watch movies and television programs, read electronic books, etc. The user may interact with the digital media content using a variety of electronic devices, such as mobile devices, tablet computers, e-book readers, laptops, televisions, desktop computers, etc.

The type of electronic device employed by the user to interact with the digital media content may vary depending on a current location of the user. For example, while the user may enjoy listening to music on a surround sound system connected to a smart television when sitting in a living room, the user may generally prefer listening to music on a mobile device when at work. The user may interact with a user interface in order to select a particular digital media content item the user desires to consume in order to initiate playback or interaction with the digital media content item.

DETAILED DESCRIPTION

A technology is described for a first device that directs media content for playback on a second device configured to playback streaming media content sent to the second device from a centralized music server. The first device may be referred to as a source device and the second device may be referred to as a target device. The source device and the target device may be associated with one user account. The user account may be registered with a media content playback service. The user account may be used by a single user or multiple related users (e.g., members of a family or organization). The user account may allow the user to interact with media content (e.g., music, movies, audio books, games, etc.) through the media content playback service. The source device may indicate a selection of particular media content items to the media content playback service, and the target device may retrieve the media content items from the media content playback service and play back the media content items at the target device.

In one example, the target device may execute a media content playback application when the target device is turned on and connected to a network. The target device, via the media content playback application, may periodically communicate with the media content playback service. The target device may periodically send availability messages to the media content playback service. An availability message may indicate to the media content playback service that the target device is available for media content playback. In other words, the availability message may indicate that the target device is available for media content playback if directed by the source device. The availability message sent to the media content playback service may include a unique device identifier associated with the target device.

The target device may send the availability message to the media content playback service at defined intervals (e.g., approximately every five seconds). The availability message may also be referred to as a keep-alive message. The media content playback service may maintain a registry for a plurality of available target devices (e.g., for individual user accounts). The media content playback service may add the target device to the registry after receiving the availability message from the target device. When the target device does not send the availability message to the media content playback service after a defined time period (e.g., 30 seconds), the media content playback service may remove the target device from the registry of available target devices.

In one example, the source device may execute a media content playback application when the source device is turned on and connected to the network. The media content playback application executed at the source device may be a copy of (or similar to) the media content playback application executed at the target device. In one example, the two media content playback applications may have slight variations (e.g., different version numbers or different third-party sources that use the same media interfaces). The source device may direct media content to the target device via the media content playback service to enable playback of the media content at the target device. The source device may send, via the media content playback application, a music playback request message to the media content playback service. The music playback request message may indicate the source device's instructions to direct media content for playback. However, at this point, the source device may not know which target devices are available for playback.

The media content playback service may receive the music playback request message and identify the registry for the plurality of available target devices. The media content playback service may identify a list of available target devices from the registry that correspond to the source device. In other words, the media content playback service may extract the target devices from the registry that share a common user account or user (e.g., common customer ID) with the source device. In one example, the target devices on the list may be associated with a user account that is also associated with the source device. In addition, the target devices on the list may include target devices that are available for an active customer identifier for the user account associated with the source device.

The media content playback service may send the list of available target devices to the source device. The source device may select a particular available target device from the list, and the source device may send a playback message to the media content playback service that indicates the selected target device. The playback message may include a source device identifier associated with the source device, a target device identifier associated with the target device, and a playback item identifier. Further, the playback item identifier may specify particular media content items that are to be directed from the source device to the target device via the media content playback service.

The media content playback service may store the playback message for pulling by the target device. The target device may periodically poll or query the media content playback service for playback messages. For example, the target device may poll or query the media content playback service approximately every five seconds for playback messages. The target device may obtain the playback message and be enabled to initiate playback of the media content item(s). The target device may initiate the playback based on the information included in the playback message. In one example, the target device may begin streaming the media content item(s) obtained from the media content playback service.

Figure 1:
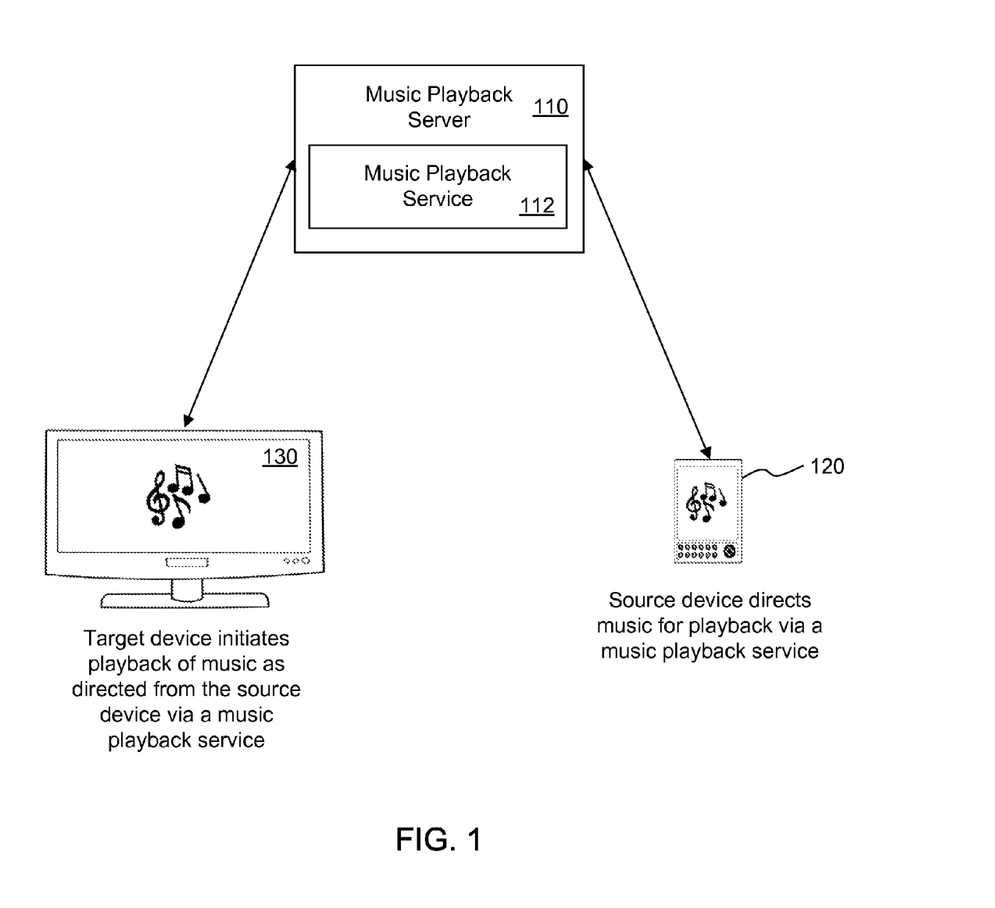
FIG. 1 illustrates a system for directing music for playback on a target device according to an example of the present technology.

FIG. 1 illustrates an exemplary system for directing music for playback on a target device 130. The music may be directed to the target device 130 from a source device 120 via a music playback service 112. The music playback service 112 may operate on a music playback server 110. In one example, the source device 120 may be a mobile phone and the target device 130 may be a smart television. The source device 120 and the target device 130 may each be executing a copy of a music playback application that is logged in under one user account. The source device 120 and the target device 130 may have both been previously registered and/or authenticated with the music playback service 112.

A user of the source device 120 may view listenable music tracks via the music playback application, but rather than listening to the music tracks on the source device 120, the user may wish to listen to the music tracks on the target device 130. Further, the user may desire to direct music for another person to listen to on the target device 130. Therefore, the user may direct music from the source device 120 to the target device 130 via the music playback service 112. The source device 120 and the target device 130 do not need to be paired together in order for the music tracks to be directed to the target device 130. More specifically, the source device 120 may direct the music tracks for playback on the target device 130 irrespective of having a previous point-to-point (P2P) configuration between the source device 120 and the target device 130.

The user may select music tracks via the music playback application on the source device 130. The source device 120 may send a playback message to the music playback service 112 that includes an indication of the music tracks. The playback message may include an identifier of the target device 130. The target device 130 may pull the playback message from the music playback service 112 based on the identifier included in the playback message, identify the music tracks indicated in the playback message, and retrieve the music tracks from the music playback service 112. Therefore, the target device 130 may play the music tracks as directed by the source device 120.

The target device 130 may play the music tracks using the music playback application that is being executed on the target device 130. The target device 130 may have the appropriate permissions to access and play the music tracks since the target device 130 and the source device 120 are both running copies of the music playback application under one user account. In other words, music tracks that are accessible from the music playback server by the source device 120 may also be accessible by the target device 130. In one example, the source device 120 may effectively remote instructions for the target device 130 via the music playback server 110. The source device 120 may select which music tracks are to be played, and the target device 130 may perform the playback of the music tracks. The user may also enter additional commands at the source device (e.g., adjust volume, pause playback, stop playback, skip music tracks). The additional commands may be included in playback messages, and the target device 130 may retrieve the playback messages and perform the additional commands.

In one example, the user may have several devices that are capable of playing media content (e.g., songs, videos, audio books, etc.). The user may prefer certain devices over other devices depending on the user's location in an area (e.g., at the user's home) or a certain device may be preferred based on who will be consuming the media content. For example, if the user is in a bedroom, the user may prefer playing media content on a tablet device. However, if the user is in a living room, the user may prefer playing media content on a living room device (e.g., a smart television and a surround sound system). Therefore, the user may be provided with an ability to choose the media content on one device (e.g., a device with a more user friendly interface) and then play the media content on another device.

In another example, the source device 120 and the target device 130 may be in separate locations. For example, the source device 120 may be located in China and the target device 130 may be located in the United States. The source device 120 and the target device 130 may be registered under one user account. A user with the source device 120 may wish to direct Chinese pop music the target device 130 for the user's children at home in the United States. If the target device 130 is available for playback, then the source device 130 may direct the Chinese pop music for playback on the target device 130.

Figure 2:
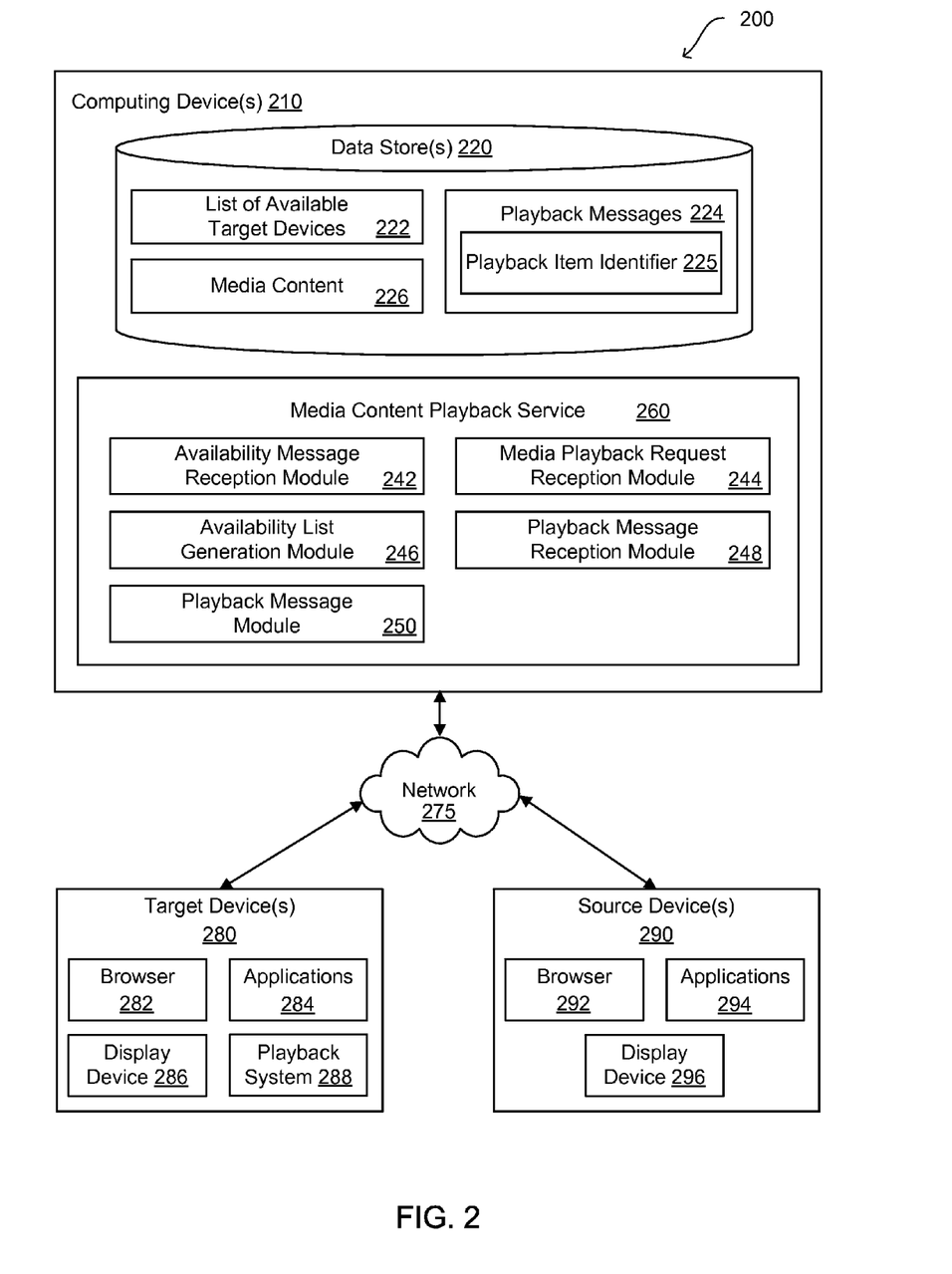
FIG. 2 is an illustration of a networked system for directing music for playback on a target device according to an example of the present technology.

In the following discussion, a general description of an example system for directing music to a target device and the system's components are provided. The general description is followed by a discussion of the operation of the components in a system for the technology. FIG. 2 illustrates a networked environment 200 according to one example of the present technology. The networked environment 200 may include one or more computing devices 210 in data communication with a target device 280 and/or a source device 290 by way of a network 275. The network 275 may include the Internet, intranets, extranets, wide area networks (WANs), local area networks (LANs), wired networks, wireless networks, or other suitable networks, etc., or any combination of two or more such networks.

Various applications, services and/or other functionality may be executed in the computing device 210 according to varying configurations. Also, various data may be stored in a data store 220 that is accessible to the computing device 210. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media. The data stored in the data store 220, for example, may be associated with the operation of the various applications and/or functional entities described below.

The data stored in the data store 220 may include a list of available target devices 222. The list of available target devices 222 may include target devices 280 at which the source device 290 may direct media content 226 from the computing device 210 for playback. The list of available target devices 222 may be tailored to or specific to the source device 290. For example, the list of available target devices 222 may include target devices 222 for a user account that is also associated with the source device 290. The list of available target devices 222 may not include target devices 222 that are not allowed to perform playback of media content 226 directed from the source device 290. Therefore, the target devices 280 that are associated with a user account that is not associated with the source device 290 may not be included in the list of available target devices 222. Target devices 280 that belong to a user account but do not have the appropriate playback application may also be excluded from the listing of available target devices 222. The list of available target devices 222 may be generated and modified based on availability messages (or keep-alive messages) received from the target devices 280.

The data stored in the data store 220 may include playback messages 224. The playback messages 224 may be temporarily stored for a defined period of time (e.g., two to ten minutes). A playback message 224 may indicate that the source device 290 is providing instructions to direct media content 226 to a selected target device 280. The playback message 224 may include a source device identifier associated with the source device 290, a target device identifier associated with the target device 280, and a playback item identifier. The playback item identifier may specify particular media content (e.g., a video clip, music, etc.) that is to be played on the target device 280 as instructed by the source device 290. In addition, the playback message 224 may include other playback commands, such as a pause command, a stop command, a skip command, a volume command, etc.

The data stored in the data store 220 may include media content 226. In one example, the media content 226 may be stored in a separate location with respect to the media content playback service 260. The media content 226 may be accessed via a link or reference to a data store or storage location in the playback message 224. The media content 226 may be associated with a media content playback service 260, which may include an electronic retail store or a media content provider network. The media content 226 may include, but is not limited to, digital versions of music, videos, television shows, books, magazines, newspapers, games, apps, etc. The media content 226 (or portions of the media content 226) may be accessible for playback by the target device 280 and the source device 290. The media content 226 may be compatible for consumption or playback on a variety of electronic devices, such as televisions, mobile devices, mobile phones, game consoles, tablet computers, desktop computers, etc.

The components executed on the computing device 210 may include a availability message reception module 242, a media playback request reception module 244, an availability list generation module 246, a playback message reception module 248, a playback message module 250, and other applications, services, processes, systems, engines, or functionality not discussed in detail herein. The availability message reception module 242, the media playback request reception module 244, the availability list generation module 246, the playback message reception module 248, and the playback message module 250 may be part of the media content playback service 260. The media content playback service 260 may enable the source device 290 to direct media content playback to the target device 280 for playback of the media content by the target device 280.

The availability message reception module 242 may be configured to receive an availability message from the target device 280. The availability message may indicate that the target device 280 is available for playback of media content 226 as directed by a source device 290. In one example, the target device 280 may be added to a registry of available target devices 280 for media content playback. In another example, the availability message reception module 242 may periodically receive the availability message from the target device 280 (e.g., approximately every 5 seconds). The availability message may also be referred to as a keep-alive message. The availability message reception module 242 may not receive the availability message from the target device 280 when: the target device 280 is not logged into a media content playback application, the target device 280 is turned off and/or the target device 280 is otherwise unavailable for media content playback.

The media playback request reception module 244 may be configured to receive a media content playback request from the source device 290. The media content playback request may indicate that the source device 290 intends to direct media content 226 via the media content playback service 260. The source device 290 may direct the media content 226 to an available target device 280, but the source device 290 may not initially know which target devices 280 are available when the media content playback request is sent to the media playback request reception module 244. In one example, the source device 290 may direct a particular song, playlist, album, video, etc. to the available target device 280.

The availability list generation module 246 may be configured to identify a list of available target devices 222 from the registry of available target devices 280. The available target devices 280 included in the list may be associated with a user account that is shared with the source device 290. For example, the target devices 280 on the list and the source device 290 may be registered with the media content playback service 260 under one user account. In one example, the availability list generation module 246 may dynamically modify the list of available target devices 222 based on the availability messages that are received from the target device 280. For example, the availability list generation module 246 may remove the target device 280 from the list of available target devices 222 when the target device 280 has not communicated an availability message for a defined period of time (e.g., 30 seconds). In one configuration, the list of available target devices 222 may be provided to the source device 290. The list of available target devices 222 may enable the source device 290 to detect which target devices 280 are available for music playback and which target devices 280 are unavailable for music playback.

The playback message reception module 248 may be configured to receive a playback message 224 from the source device 290. The source device 290 may send the playback message 224 before or after receiving the list of available target devices 222. The playback message 224 may include a selection of the target device 280 from the list of available target devices 222. In other words, the playback message 224 may indicate that the source device 290 intends to direct media content to a particular target device 280. The playback message 224 received from the source device 290 may include a source device identifier associated with the source device 290, a target device identifier associated with the target device 280, and a playback item identifier 225. The playback item identifier 225 may specify a particular media content item (e.g., song, album) that is to be directed from the source device 290. In addition, the playback message 224 may include a playback command to be performed at the target device 280. Some non-limiting examples of playback commands may include a play command, a pause command, a seek command, a forward command, a reverse command, a zoom command, a skip command or a command to change a viewing angle, or any other command.

The playback message module 250 may be configured to store the playback message 224 for a defined period of time (e.g., two to twenty minutes). The playback message module 250 may store the playback message 224 for pulling by the target device 280. Available target devices 280 may periodically poll or query the media content playback service 260 for outstanding playback messages. A playback message 224 that includes an identifier of the target device 280 may be pulled by the target device 280. As a non-limiting example, the target device 280 may poll the media content playback service 260 approximately every 5 seconds for outstanding playback messages. The target device 280 may retrieve the playback message 224 and initiate playback of the media content 226 as directed by the source device 290. The playback message module 250 may discard the playback message 224 if the playback message 224 is not pulled by the target device 280 after a certain period of time (e.g., two to twenty minutes).

Certain processing modules may be discussed in connection with this technology and FIG. 2. In one example configuration, a module of FIG. 2 may be considered a service with one or more processes executing on a server or other computer hardware. Such services may be centrally hosted functionality or a service application that may receive requests and provide output to other services or customer devices. For example, modules providing services may be considered on-demand computing that are hosted in a server, cloud, grid, or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 210 may comprise, for example, a server computer or any other system providing computing capability. Alternatively, a plurality of computing devices 210 may be employed that are arranged, for example, in one or more server banks, computer banks or other computing arrangements. For example, a plurality of computing devices 210 together may comprise a clustered computing resource, virtualization server, a grid computing resource, and/or any other distributed computing arrangement. Such computing devices 210 and data stores 220 may be located in a single installation or may be distributed among many different geographical locations. For purposes of convenience, the computing device 210 is referred to herein in the singular. Even though the computing device 210 is referred to in the singular, it is understood that a plurality of computing devices 210 may be employed in the various arrangements as described above.

The target device 280 and the source device 290 may be representative of a plurality of client devices that may be coupled to the network 275. The target device 280 and the source device 290 may comprise, for example, a processor-based system such as a computer system. Such a computer system may be embodied in the form of a desktop computer, a laptop computer, personal digital assistants, cellular telephones, smartphones, voice-controlled playback devices (e.g., smart speakers), set-top boxes, network-enabled televisions, music players, tablet computer systems, game consoles, electronic book readers, or other devices with like capability.

The target device 280 may be configured to execute various applications such as a browser 282, and/or other applications 284. The applications 284 may correspond to code that is executed in the browser 282 (e.g., web applications). The applications 284 may also correspond to standalone applications, such as networked applications. The applications 284 may include music playback applications that are executed on the target device 280. Similarly, the source device 290 may be configured to execute various applications such as a browser 292 and/or other applications 294 (e.g., music playback applications).

The target device 280 may include or be coupled to a display device 286. The browser 282 may be executed on the target device 280, for example, to access and render network pages (e.g. web pages) or other network content served up by the computing device 210 and/or other servers. The display device 286 may comprise, for example, one or more devices such as cathode ray tubes (CRTs), liquid crystal display (LCD) screens, gas plasma-based flat panel displays, LCD projectors, or other types of display devices, etc. In addition, the display device 286 may include an audio device, tactile device (e.g., braille machine) or another output device to feedback to a customer. Similarly, the source device 290 may include or be coupled to a display device 296.

The target device 280 may include or be coupled to a playback system 288. The playback system 288 may enable playback of media content at the target device 280 as directed by the source device 290. In one configuration, the playback system 288 may be built-in to the target device 280. For example, the playback system 288 may include built-in speakers. In an alternative configuration, the playback system 288 may include a separate audio system that is connected to the target device 280, such as a surround sound system or a virtualized surround sound system.

Figure 3:
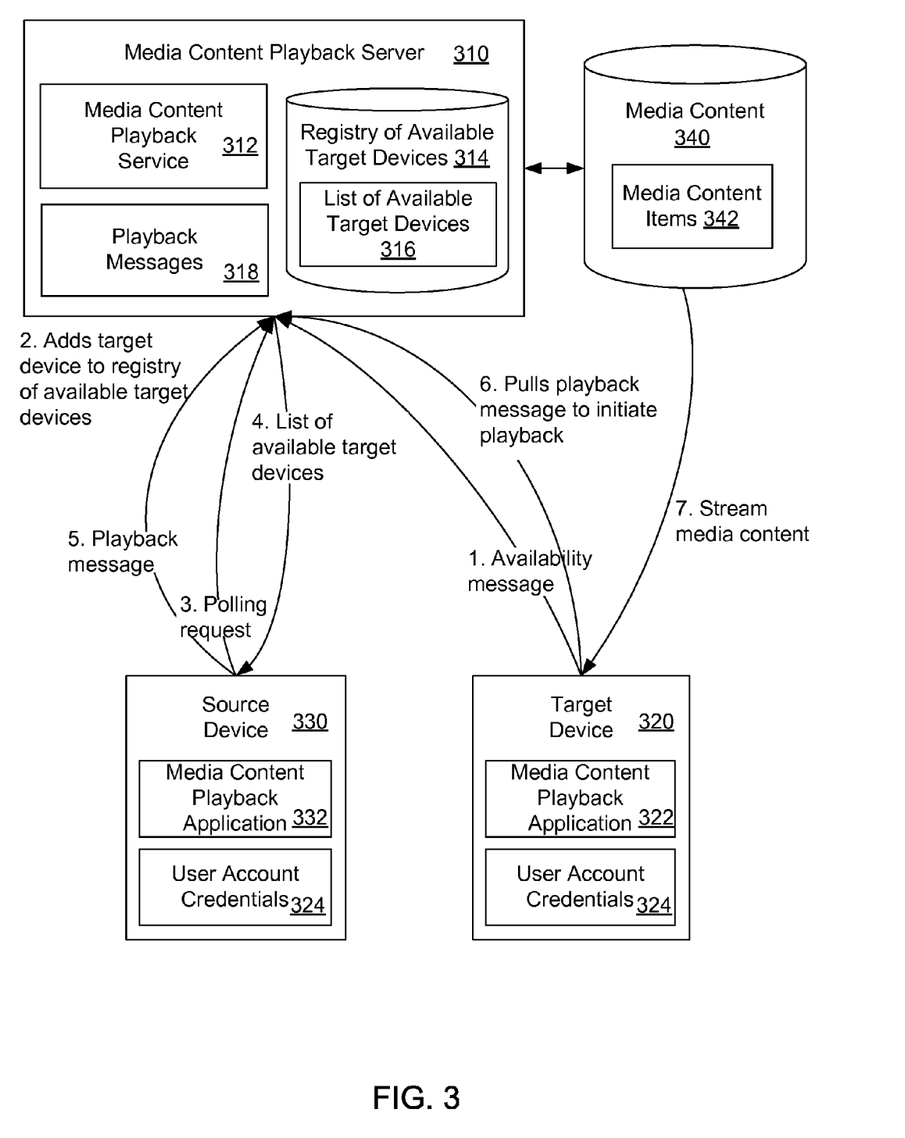
FIG. 3 illustrates a system and related operations for directing media content using a source device for playback on a target device via a media content playback service according to an example of the present technology.

FIG. 3 illustrates an exemplary system and related operations for directing media content for playback on a target device 320 via a media content playback service 312 using a source device 330. The media content playback service 312 may operate on a media content playback server 310. The media content playback service 312 may enable playback of media content items 342 at the target device 320. The media content items 342 may be stored in a media content data store 340, and the media content data store 340 may be part of or in communication with the media content playback server 310.

The source device 330 may execute a media content playback application 332 that is logged in with or registered with the media content playback service 312 using user account credentials 324. Similarly, the target device 320 may execute a media content playback application 322 that is logged in with or registered with the media content playback service 312 using the user account credentials 324. In one example, the media content playback application 332 on the target device 320 and the media content playback application 322 on the source device 330 may be copies of the same music playback application (or interchangeably similar applications). In addition, the target device 320 and the source device 330 may be registered with the media content playback service 312 under one user account.

The user account may be registered with the media content playback service 312. The user account may be used by a single user or multiple related users (e.g., members of a family). The user account may allow the user to interact with media content 340 (e.g., music, movies) through the media content playback service 312.

In one example, the source device 330 may be instructed to direct media content items 342 for playback on the target device 320. The source device 330 may direct the media content items 342 to the target device 320 via the media content playback service 312. As described in further detail below, the source device 330 may generate a playback message for a selected target device 320 that includes an indication of media content items 342 to be played. The source device 330 may send the playback message to the media content playback service 312. The target device 320 may retrieve the playback message and initiate playback of the media content items 342 indicated in the playback message.

In one configuration, the target device 320 may periodically communicate with the media content playback service 312 via the media content playback application 322. As shown in step 1, the target device 320 may periodically send availability messages to the media content playback service 312. An availability message may indicate to the media content playback service 312 that the target device 320 is available for media content playback. In other words, the availability message may indicate that the target device 320 is available for media content playback as directed by the source device 330. The availability message may include a unique device identifier associated with the target device 320.

The target device 320 may send the availability message to the media content playback service 312 at defined intervals (e.g., approximately every five seconds, every 15 seconds, every 30 seconds, every minute, etc.). The availability message may also be referred to as a keep-alive message. The availability message may be a hypertext transfer protocol (HTTP) message, a transmission control protocol (TCP) message or a user datagram protocol (UDP) message. In addition, the availability message may include authentication credentials for a user associated with the target device 320. If the target device 320 initially sends the availability message, but then does not subsequently send the availability message for a defined period of time (e.g., 30 seconds), then the media content playback service 312 may determine that the target device 320 is no longer available for media content playback.

In an alternative configuration, the target device 320 may not continually send the availability messages to the media content playback service 312. Instead, the media content playback service 312 may maintain an open connection with the target device 320. The open connection may be established when the target device 320 sends an initial availability message to the media content playback service 312. The open connection may remain until the media content playback service 312 and/or the target device 320 close the connection.

As shown in step 2, the media content playback service 312 may maintain a registry of available target devices 314. The registry of available target devices 314 may maintain an availability status for a plurality of target devices. The media content playback service 312 may add the target device 320 to the registry after receiving the availability message from the target device 320. When the target device 320 does not send the availability message to the media content playback service 312 after a defined time period (e.g., 30 seconds), the media content playback service may remove the target device from the registry of available target devices 314.

As shown in step 3, the source device 330 may send, via the media content playback application 332, a polling request to the media content playback service 312. The source device 330 may periodically send the polling request according to a defined interval. The polling request may request a list of available target devices 316 from the media content playback service 312.

As an alternative, in step 3, the source device 330 may send, via the media content playback application 332, a music directing request message to the media content playback service 312. The source device 330 may send the music directing request message when the source device 330 is instructed by a user to direct the media content items 342 to an available target device. However, at this point, the source device 330 may not know which target devices are available for media content playback.

As shown in step 4, the media content playback service 312 may send the list of available target devices 316 to the source device 330. The media content playback service 312 may send the list in response to the music directing the polling request or the request message from the source device 330. The media content playback service 312 may generate the list of available target devices 316 based on the registry of available target devices 314. The target devices 320 on the list 316 may be associated with the source device 330. In other words, the media content playback service 312 may extract the target devices from the registry that share a common user account with the source device 330. In one example, the target devices extracted from the registry to form the list may include target devices 320 that are available for an active customer identifier for the user account associated with the source device 330. The source device 330 may receive the list of available target devices 316 from the media content playback service 312. The list of available target devices 316 may indicate that a target device 320 is available for media content playback as directed by the source device 330. As shown in step 5, the source device 330 may send a playback message 318 to the media content playback service 312. The playback message 318 may indicate a selection of the target device 320 for the directing of media content playback. The playback message 318 may include a source device identifier associated with the source device 330, a target device identifier associated with the target device 320, and a playback item identifier. The playback item identifier may specify particular media content items 342 that are to be directed from the source device 330 to the target device 320 via the media content playback service 312. The playback message 318 may include a variety of playback commands, such as stop playback, pause playback, skip to a next media content item 342, adjust a volume, etc. to be performed at the target device 320.

The media content playback service 312 may store the playback message 318 for pulling by the target device 320. As shown in step 6, the target device 320 may periodically poll the media content playback service 312 for playback messages 318. For example, the target device 320 may poll the media content playback service 312 approximately every five seconds for playback messages 318. The target device 320 may identify and retrieve the playback message 318 based on the target device identifier included in the playback message 318. If the target device 320 does not pull the playback message 318 after a certain period of time (e.g., three minutes), then the media content playback service 312 may discard the playback message 318.

The target device 320 may obtain the playback message 318 and perform a playback function indicated in the playback message 318. For example, the target device 320 may initiate playback of the media content items 342 indicated in the playback message 318, and the target device 320 may begin streaming the media content items 342 via the media content playback service 312, as shown in step 7. If the source device 330 sends subsequent playback messages 318 with other playback functions, the target device 320 may pull these playback messages 318 as well. Non-limiting examples of other playback functions may include pausing playback, stopping playback, or skipping to a later media content item 342. Therefore, the source device 330 may effectively act as a remote control for the target device 320. In other words, a user of the source device 330 may select which media content items 342 are to be played, send this information to the media content playback service 312 as a playback message 318, and then the target device 320 may retrieve the playback message 318 and play the media content items 342 accordingly.

In an alternative configuration, the media content playback service 312 may automatically send the list of available target devices 316 to the source device 330. In other words, the media content playback service 312 may not send the list in response to receiving the music directing request message from the source device 330. Instead, the source device 330 may receive the list of available target devices 316 and send the playback message 318 with a selected target device 320 to the media content playback service 312 via the media content playback application 332. In addition, the playback message 318 may include a target device identifier associated with the target device 320. The target device 320 may pull the playback message 318 and initiate playback of the media content.

In an alternative configuration, the target device 320 may not periodically pull the playback messages 318 from the media content playback service 312. Instead, the media content playback service 312 may receive the playback message 318 from the source device 330, and then directly forward (i.e., push) the playback message 318 to the target device 320. The target device 320 may initiate playback of the media content items 342 after receiving the playback message 318 from the media content playback service 312.

In one configuration, the list of available target devices 316 may indicate that multiple target devices are available for media content playback. The multiple target devices may correspond with or each be linked to one user account, which is also associated with the source device 330. The source device 330 may direct playback of media content items 342 to the multiple target devices. The source device 330 may send multiple playback messages 318 to the media content playback service 312. The multiple target devices may each pull the playback messages 318 from the media content playback service 312, and then perform playback of the media content items 342 accordingly. Therefore, the source device 330 may simultaneously direct media content items 342 for playback on more than one target device. In one example, the media content playback service 312 may duplicate the playback messages 318 received from the source device 330, and the multiple target devices may pull the duplicated playback messages 318 from the media content playback service 312.

In one example, the target device 320 and the source device 330 may be owned and operated by one user. The target device 320 and the source device 330 may each be registered with the media content playback service 312 upon purchase. However, in one example, the target device 320 may not be registered or authorized with the media content playback service 312. For example, the target device 320 may be a public computer. The user may access the media content playback application 322 via a browser that is executing on the public computer. In this case, the target device 320 may be included in the list of available target devices 316, and the source device 330 may direct media content 340 for playback on the target device 320. When the target device 320 (e.g., the public computer) ceases to send the availability message to the media content playback service 312, the target device 320 may be removed from the list of available target devices 316. In another example, user credentials for the target device 320 may be timed out after a certain period of time (e.g., three days).

In one configuration, the media content playback application 322 may not be initially executed at the target device 320. In other words, the target device 320 may not be initially logged in using the user account credentials 324. However, the target device 320 may periodically send the availability messages to the media content playback service 312 to indicate availability for media content playback. Therefore, the target device 320 may be included in the list of available target devices 316. The source device 330 may send the playback message 318 to the media content playback service 312 that includes a selection of the target device 320. The target device 320 may poll the media content playback service 312 and retrieve the playback message 318. At that point, the target device 320 may initiate the media content playback application 322, log in using the user account credentials 324, and begin playback of the media content items 342 indicated in the playback message 318.

Figure 4:
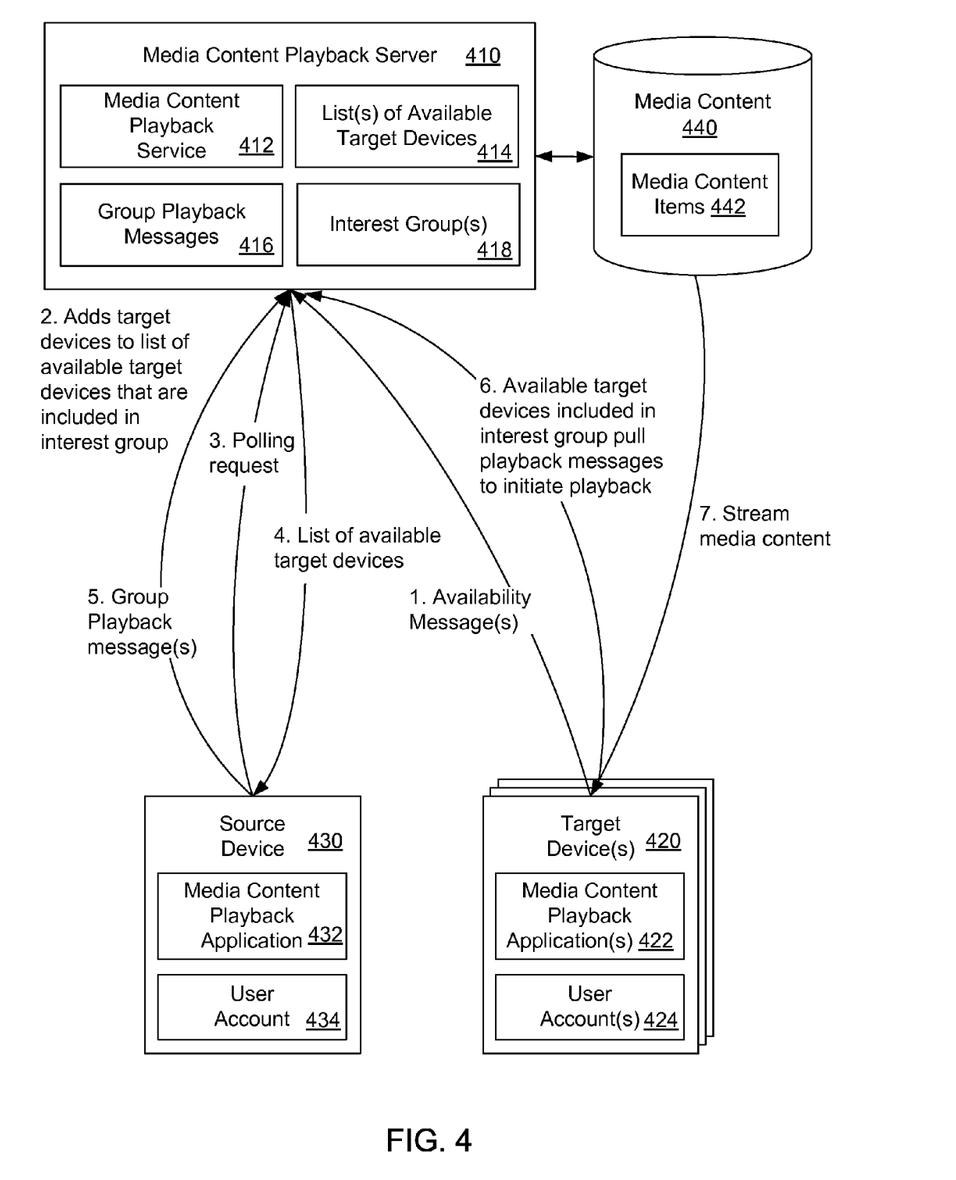
FIG. 4 illustrates a system and related operations for directing media content using a source device for playback on multiple available target devices that are included in an interest group according to an example of the present technology.

FIG. 4 illustrates an exemplary system and related operations to enable a source device 430 to direct media content 440 playback on multiple available target devices 420 that are included in an interest group 418. The media content 440 may be directed via a media content playback service 412 that operates on a media content playback server 410. The target devices 420 included in the interest group 418 may each share a common media content interest. The interest group 418 may be related to a particular musical artist, musical genre, video genre (e.g., documentaries), etc. When target devices 420 that are part of the interest group 418 are available for playback, the source device 430 may direct media content items 442 related to the common media content interest for playback on the available target devices 420. In other words, the source device 430 may direct the media content items 442 to the multiple available target devices 420 via the media content playback service 412 in a simultaneous manner.

The target devices 420 may be executing media content playback applications 422 that enable the target devices 420 to communicate with the media content playback service. The target devices 420 may be executing copies of the same (or substantially the same) music playback application 422. Although each of the target devices 420 may be logged in under a user account 424, multiple user accounts 424 may be associated with the multiple target devices 420. In other words, each target device 420 may be associated with a distinct user account 424 but also be associated with the common interest group 418 in order to receive instructions from the source device 430.

As shown in step 1, a plurality of target devices 420 may send an availability message to the media content playback service 412. The availability message may also be referred to as an availability message or a keep-alive message. The target devices 420 may be included in one or more interest groups 418. The target devices 420 may send the availability messages to indicate an availability for playback of media content 440 directed by the source device 430.

As shown in step 2, the media content playback service 412 may add the available target devices 420 to list(s) of available target devices 414. Each list of available target devices 414 may be associated with a certain interest group 418. For example, a first interest group related to rock music may be associated with a first list of available target devices, a second interest group related to nature documentaries may be associated with a second list of available target devices, etc.

As shown in step 3, the media content playback service 412 may receive a polling request from the source device 430. The source device 430 may periodically send the polling request according to a defined interval. The source device 430 may send the polling request in order to request a list of available target devices 414. As an alternative, in step 3, the media content playback service 412 may receive a group playback request from the source device 430. The group playback request may indicate that the source device 430 is instructed by a user to direct media content items 442 to available target devices included in a particular interest group 418. The source device 430 may send the group playback request via a media content playback application 432 that is executing at the source device 430. The source device 430 may be logged in with the media content playback service 412 under a user account 434. In one example, the user account 434 may have sufficient authorization or permissions, such that the source device 430 may direct media content items 442 for playback on multiple target devices 420 that are included in the interest group 418.

As shown in step 4, the media content playback service 412 may provide the list of available target devices 414 to the source device 430. The media content playback service 412 may provide the list of available target devices 414 in response to receiving the polling request or the group playback request from the source device 430. The list of available target devices 414 may include available target devices 420 that are in a particular interest group 418. Each of the target devices 414 on the list may be currently available for media content playback.

As shown in step 5, the source device 430 may send a group playback message 416 for each available target device 420 on the list of available target devices 414. In other words, the source device 430 may send the group playback message 416 for each available target device 420 that is included in the interest group 418. Each group playback message 416 may include a source device identifier associated with the source device 430, a target device identifier associated with a target device 420, and a playback item identifier. In addition, the group playback message 416 may include a variety of playback commands, such as stop playback, pause playback, skip to a next media content item 442, adjust a volume, etc.

The media content playback service 412 may store the group playback messages 416 for pulling by the target devices 420. As shown in step 6, the target devices 420 may periodically poll the media content playback service 412 for group playback messages 416. For example, each available target device 420 that is included in the interest group 418 may periodically poll the media content playback service 412. Each of the target devices 420 may obtain a corresponding group playback message 416 (i.e., a group playback message 416 that is associated with the target device 420) and perform a playback function indicated in the group playback message 416. As shown in step 7, the target devices 420 may stream media content items 442 via the media content playback service 412. Therefore, the source device 430 may direct media content items 442 to a select group of available target devices 420 based on an interest associated with the group.

As a non-limiting example, the source device 430 may direct distinct playlists to available target devices 420 in a rock group. As long as the target devices 420 included in the rock group are actively registered with the media content playback service 412, the target devices 420 may pull group playback messages 416 and perform music playback accordingly.

In one example, the target device 420 may be a voice-controlled playback device, such as a smart speaker. A user of the target device 420 may instruct the target device 420 to join a particular interest group (e.g., a 80s pop music group) using voice commands. In response, the target device 420 may send an availability message to the media content playback service 412 indicating that the target device 420 is available to receive music as part of the interest group. The target device 420 may be added to a list of available target devices 414 for the interest group. Therefore, the target device 420 may receive the music when the source device 430 directs music to the interest group.

Figure 5:
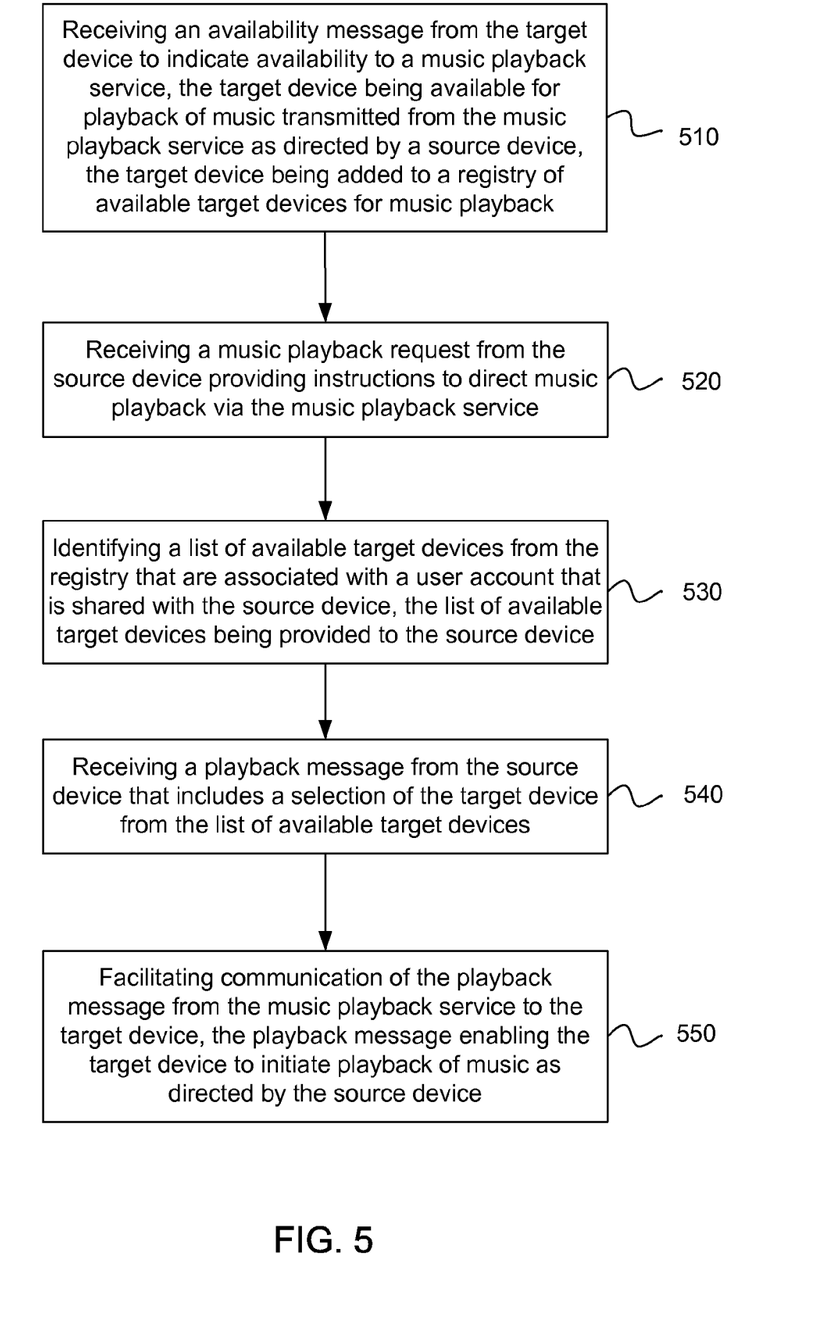
FIG. 5 is a flowchart of an example method for directing music to a target device.

FIG. 5 illustrates an example of a method for directing music to a target device. An availability message may be received from the target device to indicate availability to a music playback service, as in block 510. The availability message may indicate that the target device is available for playback of music transmitted from the music playback service as directed by a source device. The target device may be added to a registry of available target devices for music playback. In one example, availability messages may be periodically received from the target device to maintain an availability of the target device for music playback.

A music playback request providing instructions to direct music playback via the music playback service may be received from the source device, as in block 520. The source device may direct the music to one of the available target devices on the registry of available target devices. For example, the source device may direct a song, a music playlist, a musical album, etc.

A list of available target devices may be identified from the registry, as in block 530. The available target devices included in the list may be associated with a user account that is shared with the source device. For example, the target devices on the list and the source device may be registered with the music playback service under one user account. The list of available target devices may be provided to the source device. The list of available target devices may enable the source device to learn which target devices are available for music playback and which target devices are unavailable for music playback. The list of available target devices may dynamically change as target devices become available or unavailable.

A playback message may be received from the source device that includes a selection of the target device from the list of available target devices, as in block 540. In other words, the playback message may indicate a particular available target device to which the source device intends to direct the music.

Communication of the playback message from the music playback service to the target device may be facilitated, as in block 550. The target device may periodically poll the music playback service for playback messages. The playback message may enable the target device to initiate playback of music as directed by the source device. In one example, the target device and the source device may both be executing a copy of a music playback application logged into the user account when the source device is directing music for playback on the target device via the music playback service.

Figure 6:
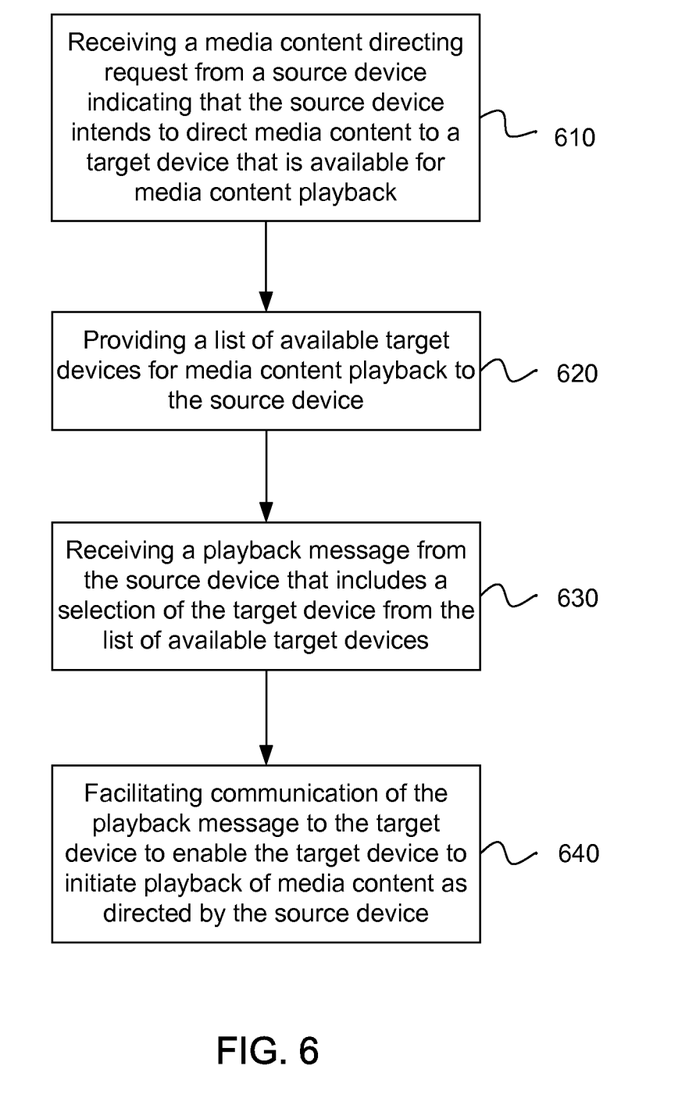
FIG. 6 is a flowchart of an example method for directing media content to a target device.

FIG. 6 illustrates an example of a method for directing media content to a target device. A media content directing request may be received from a source device indicating that the source device wishes to direct media content to a target device that is available for media content playback, as in block 610. In one example, the source device may direct the media content to the target device for playback via a media content playback service. In another example, the target device and the source device may be associated with one user account.

A list of available target devices for media content playback may be provided to the source device, as in block 620. The list of available target devices for media content playback provided to the source device may include target devices that are available for an active customer identifier for a user account associated with the source device. In one example, an availability message may be received from the target device indicating that the target device is available for playback of media content directed from the source device. The availability message may include a unique identifier of the target device.

A playback message may be received from the source device that includes a selection of the target device from the list of available target devices, as in block 630. The playback message received from the source devices may include a source device identifier, a target device identifier, and a playback item identifier. In addition, the playback message received from the source device may include a playback command. Some non-limiting examples of playback commands may include a play command, a pause command, a seek command, a forward command, a reverse command, a zoom command, a skip command, a command to change a viewing angle, or any other command.

Communication of the playback message to the target device may be facilitated to initiate playback of media content as directed by the source device, as in block 640. In one example, the communication of the playback message to the target device may be facilitated by forwarding the playback message to the target device to enable the target device to initiate playback of media content directed by the source device. In another example, the communication of the playback message to the target device may be facilitated by storing the playback message for pulling by the target device, wherein the target device periodically polls for outstanding playback messages. The playback of media content at the target device may include playback of a song, a video, a music playlist, an audio book, a music station, and/or a music album.

In one example, keep-alive messages may be periodically received from the target device to maintain an availability of the target device on the list of available target devices for media content playback. The target device may be removed from the list of available target devices when a keep-alive message has not been received from the target device for a defined period of time.

In one configuration, both the target device and the source device may be executing a copy of a media content playback application logged in under one user account when the source device is directing media content for playback on the target device. In another configuration, the target device may retrieve the media content from a storage device associated with a media content playback service or a local cache in order to initiate playback of the media content directed by the source device. In yet another configuration, at least one of the source device or the target device may be authenticated with a media content playback service prior to the source device directing media content for playback to the target device.

Figure 7:
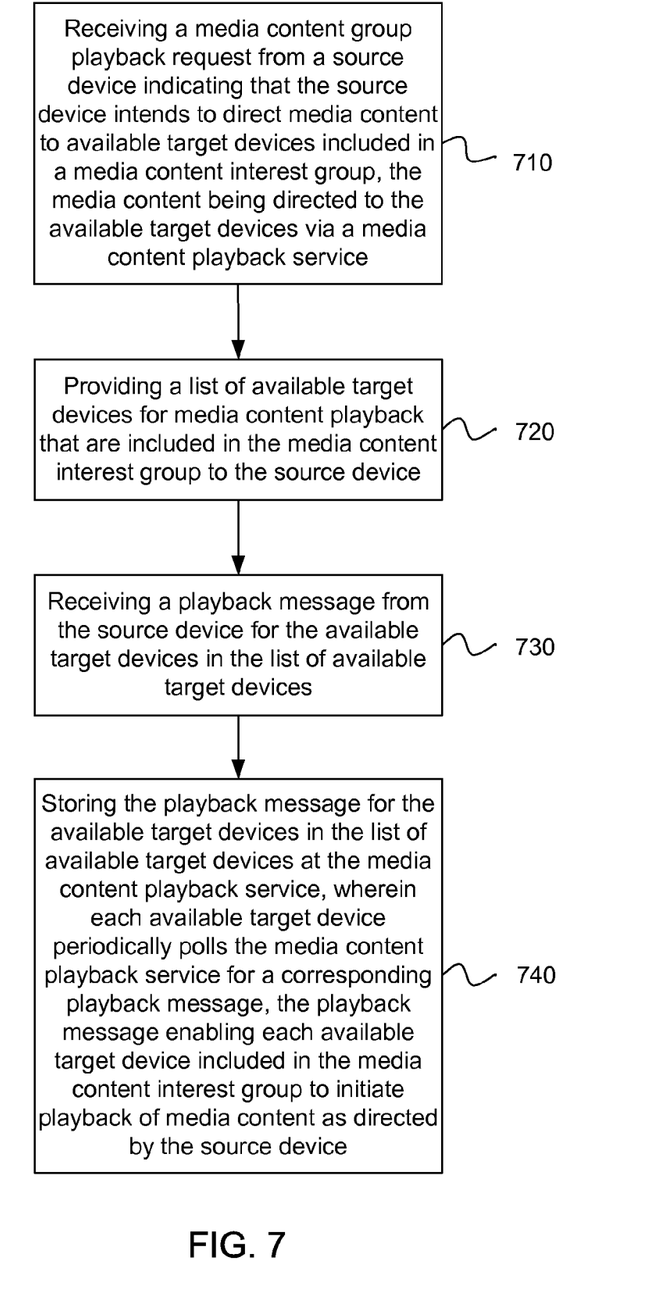
FIG. 7 is a flowchart of an example method for directing music to multiple available target devices.

FIG. 7 illustrates an example of a method for directing media content to multiple available target devices. A media content group playback request may be received from a source device indicating that the source device intends to direct media content to available target devices included in a media content interest group, as in block 710. The media content interest group may include a plurality of target devices with a defined music interest, such as a particular genre, artist, music era, etc. In one example, the target devices included in the media content interest group may be interested in particular genres of video content. The media content may be directed to the available target devices included in the media content interest group via a media content playback service.

A list of available target devices for media content playback that are included in the media content interest group may be provided to the source device, as in block 720. Each of the target devices on the list may periodically send keep-alive messages to the media content playback service in order to maintain availability for media content playback. In one example, the available target devices on the list of available target devices for media content playback may be associated with multiple user accounts.

A playback message may be received from the source device for the available target devices in the list of available target devices, as in block 730. The playback message for each available target device may include a source device identifier, a target device identifier, and a playback item identifier. In addition, the playback message may include a playback command, which may include but is not limited to, a play command, a pause command, a seek command, a forward command, a reverse command, a zoom command, a skip command, a command to change a viewing angle, or any other command.

The playback message for the available target devices in the list of available target devices may be stored at the media content playback service, as in block 740. The available target devices may periodically poll the media content playback service for a corresponding playback message. The playback message may enable each available target device included in the media content interest group to initiate playback of media content as directed by the source device.

Figure 8:
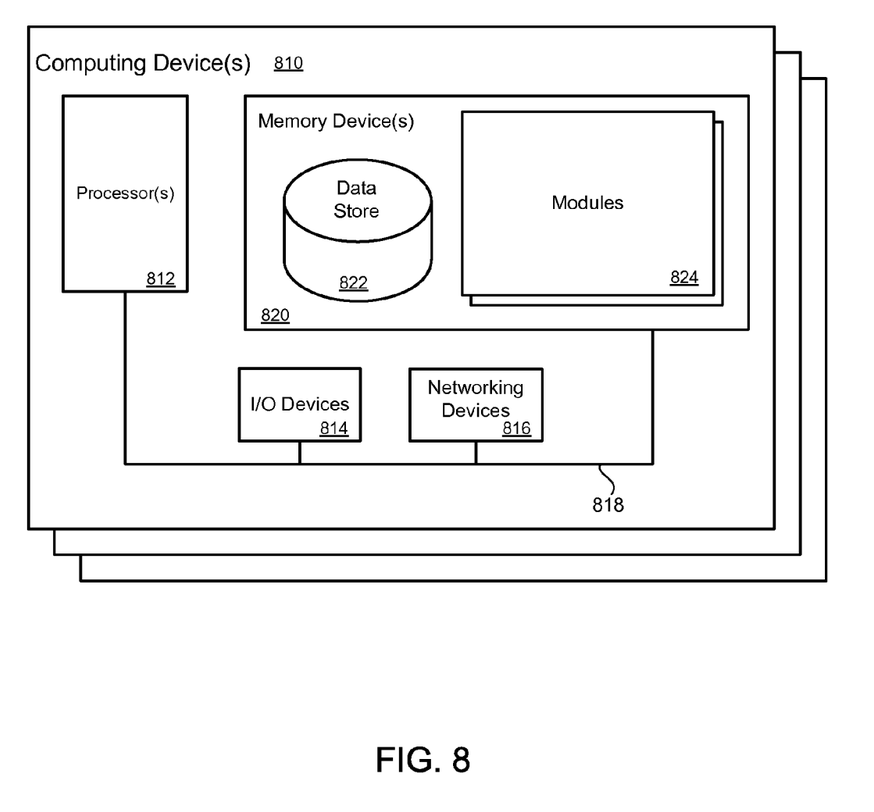
FIG. 8 is a block diagram that provides an example illustration of a computing device that may be employed in the present technology.

FIG. 8 illustrates a computing device 810 on which modules of this technology may execute. A computing device 810 is illustrated on which a high level example of the technology may be executed. The computing device 810 may include one or more processors 812 that are in communication with memory devices 820. The computing device may include a local communication interface 818 for the components in the computing device. For example, the local communication interface may be a local data bus and/or any related address or control busses as may be desired.

The memory device 820 may contain modules 824 that are executable by the processor(s) 812 and data for the modules 824. The modules 824 may execute the functions described earlier. A data store 822 may also be located in the memory device 820 for storing data related to the modules 824 and other applications along with an operating system that is executable by the processor(s) 812.

Other applications may also be stored in the memory device 820 and may be executable by the processor(s) 812. Components or modules discussed in this description that may be implemented in the form of software using high programming level languages that are compiled, interpreted or executed using a hybrid of the methods.

The computing device may also have access to I/O (input/output) devices 814 that are usable by the computing devices. An example of an I/O device is a display screen that is available to display output from the computing devices. Other known I/O device may be used with the computing device as desired. Networking devices 816 and similar communication devices may be included in the computing device. The networking devices 816 may be wired or wireless networking devices that connect to the internet, a LAN, WAN, or other computing network.

The components or modules that are shown as being stored in the memory device 820 may be executed by the processor 812. The term "executable" may mean a program file that is in a form that may be executed by a processor 812. For example, a program in a higher level language may be compiled into machine code in a format that may be loaded into a random access portion of the memory device 820 and executed by the processor 812, or source code may be loaded by another executable program and interpreted to generate instructions in a random access portion of the memory to be executed by a processor. The executable program may be stored in any portion or component of the memory device 820. For example, the memory device 820 may be random access memory (RAM), read only memory (ROM), flash memory, a solid state drive, memory card, a hard drive, optical disk, floppy disk, magnetic tape, or any other memory components.

The processor 812 may represent multiple processors and the memory 820 may represent multiple memory units that operate in parallel to the processing circuits. This may provide parallel processing channels for the processes and data in the system. The local interface 818 may be used as a network to facilitate communication between any of the multiple processors and multiple memories. The local interface 818 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A method for directing music to a target device, the method comprising:
   under control of one or more computer systems configured with executable instructions:
   receiving periodic availability messages sent by a media content playback application executing on the target device to indicate availability to a music playback service, the target device being available for playback of music transmitted from the music playback service as directed by a copy of the media content playback application that is executing on a source device, using one or more processors of the computer systems;
   maintaining a list of available target devices based on periodic receipt of the periodic availability messages, wherein the list is stored as a registry in a data store at the music playback service located remote from the target device, using one or more processors of the computer systems;
   receiving additional periodic availability messages from the target device after the target device has been added to the list of available target devices;
   receiving a music playback request from the source device providing instructions to direct music playback via the music playback service, using the one or more processors of the computer systems;
   identifying the list of available target devices from the registry that are associated with a user account that is shared with the source device, the list of available target devices being provided to the source device, using the one or more processors of the computer systems;
   receiving a playback message from the source device that includes a selection of the target device from the list of available target devices, using the one or more processors of the computer systems; and
   facilitating communication of the playback message from the music playback service to the target device, the playback message enabling the target device to initiate playback of music as directed by the source device, using the one or more processors of the computer systems.

2. The method of claim 1, wherein the target device and the source device are both executing a copy of a music playback application logged into the user account when the source device is directing music for playback on the target device via the music playback service.

3. The method of claim 1, further comprising periodically receiving keep-alive messages from the target device to maintain an availability of the target device for music playback.

4. A computer-implemented method, the method comprising:
   under control of one or more computer systems configured with executable instructions:
   receiving a media content directing request from a copy of a media content playback application that is executing on a source device indicating that the source device intends to direct media content to the media content playback application that is executing on a target device that is available for media content playback, using one or more processors of the computer systems;
   providing a list of available target devices for media content playback sent to the source device by media content playback applications executing on the target devices, using the one or more processors of the computer systems, wherein the target devices are added to the list of available target devices based on receiving periodic availability messages from the target devices to indicate availability, wherein the list is stored as a registry in a data store at a music playback service located remote from the target device, using one or more processors of the computer systems;
   receiving additional periodic availability messages from the target devices after the target devices have been added to the list of available target devices;
   receiving a playback message from the source device that includes a selection of the target device from the list of available target devices, using the one or more processors of the computer systems; and
   facilitating communication of the playback message to the target device to enable the target device to initiate playback of media content as directed by the source device, using the one or more processors of the computer systems.

5. The method of claim 4, wherein the target device and the source device are associated with one user account.

6. The method of claim 4, wherein the source device directs the media content to the target device for playback via a media content playback service.

7. The method of claim 4, further comprising periodically receiving a keep-alive message from the target device to maintain an availability of the target device in the list of available target devices for media content playback, the keep-alive message including a unique identifier of the target device.

8. The method of claim 7, further comprising removing the target device from the list of available target devices when a keep-alive message has not been received from the target device for a defined period of time.

9. The method of claim 4, further comprising authenticating at least one of the source device or the target device with a media content playback service prior to the source device directing media content for playback to the target device.

10. The method of claim 4, wherein the list of available target devices for media content playback provided to the source device include target devices that are available for an active customer identifier for a user account associated with the source device.

11. The method of claim 4, wherein facilitating communication of the playback message to the target device further comprises forwarding the playback message to the target device to enable the target device to initiate playback of media content directed by the source device.

12. The method of claim 4, wherein facilitating communication of the playback message to the target device further comprises storing the playback message for pulling by the target device, wherein the target device periodically polls for outstanding playback messages.

13. The method of claim 4, wherein the playback of media content at the target device includes playback of at least one of: a song, a video, a music playlist, a music station, a music album, or an audio book.

14. The method of claim 4, wherein the playback message received from the source device includes a source device identifier, a target device identifier, and a playback item identifier.

15. The method of claim 4, wherein the target device retrieves the media content from a storage device associated with a media content playback service or a local cache in order to initiate playback of the media content directed by the source device.

16. The method of claim 4, wherein the playback message received from the source device includes at least one of: a play command, a pause command, a seek command or a skip command.

17. The method of claim 4, wherein the target device and the source device are both executing a copy of a media content playback application logged in under one user account when the source device is directing media content for playback on the target device.

18. A method for directing media content to multiple available target devices, the method comprising:
under control of one or more computer systems configured with executable instructions:
receiving a media content group playback request from a copy of a media content playback application that is executing on a source device indicating that the source device intends to direct media content to media content playback applications that are executing on available target devices included in a media content interest group, the media content being directed to the available target devices via a media content playback service, using one or more processors of the computer systems;
providing a list of available target devices for media content playback that are included in the media content interest group to the source device, using the one or more processors of the computer systems, wherein the target devices are added to the list of available target devices based on receiving periodic availability messages from the media content playback applications executing on the target devices to indicate availability, wherein the list is stored as a registry in a data store at a music playback service located remote from the target device, using one or more processors of the computer systems;
receiving additional periodic availability messages from the target devices after the target devices have been added to the list of available target devices;
receiving a group playback message from the source device for the available target devices in the list of available target devices, using the one or more processors of the computer systems; and
storing the group playback message for the available target devices in the list of available target devices at the media content playback service, wherein each available target device periodically polls the media content playback service for a corresponding group playback message, the group playback message enabling each available target device included in the media content interest group to initiate playback of media content as directed by the source device, using the one or more processors of the computer systems.

19. The method of claim 18, wherein the available target devices on the list of available target devices for media content playback are associated with multiple user accounts.

20. The method of claim 18, further comprising receiving availability messages from target devices included in the media content interest group, the availability messages indicating that the target devices are currently available for playback of media content as directed from the source device.

* * * * *